Aug. 11, 1925.
B. LOEWE
1,549,582
DRIVING MECHANISM
Original Filed May 13, 1924
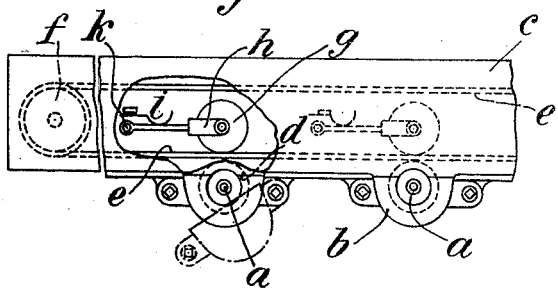
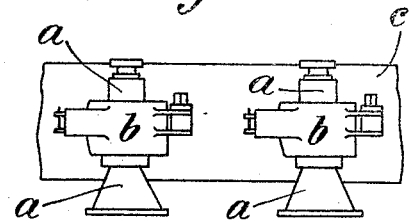
Inventor
B. Loewe,
By Marks & Clerk
Att'ys Patented Aug. 11, 1925.

1,549,582

UNITED STATES PATENT OFFICE.

BERNARD LOEWE, OF ZURICH, SWITZERLAND.

DRIVING MECHANISM.

Original application filed May 13, 1924, Serial No. 713,068. Divided and this application filed March 26, 1925. Serial No. 18,621.

*To all whom it may concern:*

Be it known that I, BERNARD LOEWE, a citizen of Turkey, residing at Zurich, in the Canton of Zurich, Republic of Switzerland, have invented certain new and useful Improvements in Driving Mechanisms, of which the following is a specification.

This application is a divisional of my copending application No. 713,068 filed May 13, 1924.

The present invention relates to driving mechanisms and especially to mechanisms for rotating a plurality of similar parts, such as for instance spindles or the like.

The object of my invention is to provide a way of driving a plurality of rotating parts by a belt or the like in such a manner that each of these parts may at will be stopped in a simple manner independently of the other rotating parts driven by the same belt.

In the drawing, Fig. 1 is a plan and Fig. 2 an elevation of a group of devices driven by a mechanism according to the present invention.

$a$ is a series of spindles adapted to revolve each in a collar bearing $b$. These bearings $b$ are mounted so as to be capable of swivelling on the outer side of a common casing or frame $c$. Each of these spindles carries a disc or driving pulley $d$. The spindles are all driven by one and the same endless belt $e$ which is arranged in the frame $c$ and runs over pulleys $f$. For each spindle $a$ there is provided a device comprising a disc $g$ pressing against the belt from inner side thereof and thereby pressing the said belt against the pulley $d$. For this purpose the disc $g$ is mounted in a member $h$ constituting a lever fulcrumed at $k$ and pressed by a spring $i$ in the direction towards the spindle $a$. On turning the member $h$ back in opposition to the action of the spring $i$, that is to say, by moving the disc $g$ away from the belt $e$ the action of the latter upon the opposite pulley $d$ is rendered null so that this spindle comes to rest while the other spindles continue to rotate. When the bearings $b$ are made to swivel, the action of the belt upon the spindle can also be annulled by swinging the bearing $b$ outwards as indicated by long-dotted lines in Figure 1 with respect to the left hand bearing.

It will be seen from the drawing that the bearings $b$ let free the upper and lower ends of the spindles $a$ so that for instance a thread may be drawn through each of these spindles from one end to the other.

A mechanism of the kind illustrated may be employed for driving any kinds of rotating parts arranged in groups, series or rows by means of one and the same driving belt or the like.

What I claim is:

1. In a mechanism for rotating a plurality of spindles or the like, a bearing for each of these spindles mounted on the outer side of a casing or frame and adapted to be swivelled in the direction away from the casing, an endless belt or the like on the inner side of this frame or casing and common to all said spindles a pressing device mounted on the inner side of the belt and adapted to press the common belt against the parts to be driven.

2. In a mechanism for rotating a plurality of spindles or the like, bearings mounted on the outer side of a common frame or casing, on which they can be fixed but are adapted to be swivelled away from the casing, an endless belt common to all spindles running on the inner side of this casing, a lever like rocking member for each of said spindles mounted in the casing on the inner side of the belt, a spring for each rocking member pressing it against the belt in the direction towards the spindle.

3. In a mechanism for rotating a plurality of spindles or the like, a bearing for each of these spindles, said bearings being mounted on the outside of a frame or casing in such a manner that they can be firmly held in position relatively to the casing during the driving period action but be loosened and swung outwards if desired, said spindles being loosely mounted in said bearings in such a manner that each end of said spindles lies free outside the bearing and is freely accessible, an endless belt that is common to all the spindles running within said frame or casing along all said bearings, a lever like rocking member on the inner side of the belt opposite to each bearing, a disc loosely mounted on this rocking member, a spring pressing this disc against the common belt and this latter against a disc or driving pulley fixed on the spindle to cause it to rotate.

In testimony whereof I have affixed signature.

BERNARD LOEWE.